United States Patent [19]
Mori

[11] Patent Number: 5,200,889
[45] Date of Patent: * Apr. 6, 1993

[54] SYSTEM FOR MAINTAINING CONTINUOUS TOTAL OF REFUND AMOUNTS DUE A CUSTOMER AND FOR ALLOWING CUSTOMER DESIGNATION OF THE AMOUNT OF REFUND TO BE APPLIED TO A PURCHASE

[75] Inventor: Kunio Mori, Tokyo, Japan

[73] Assignee: Teraoka Seiko Co., Ltd., Tokyo, Japan

[*] Notice: The portion of the term of this patent subsequent to Jun. 12, 2007 has been disclaimed.

[21] Appl. No.: 751,627

[22] Filed: Aug. 26, 1991

Related U.S. Application Data

[63] Continuation of Ser. No. 426,273, Oct. 25, 1989, abandoned.

[30] Foreign Application Priority Data

Oct. 31, 1988 [JP] Japan ................................. 63-275724

[51] Int. Cl.⁵ .............................................. G06F 15/21
[52] U.S. Cl. ....................................... 364/401; 364/408
[58] Field of Search ................... 364/401, 408; 340/712

[56] References Cited

U.S. PATENT DOCUMENTS

| 4,112,423 | 9/1978 | Bertolasi | 358/87 |
| 4,750,119 | 6/1988 | Cohen et al. | 364/408 |
| 4,879,650 | 11/1989 | Kurimoto et al. | 364/405 |
| 4,910,672 | 3/1990 | Off et al. | 364/405 |
| 4,932,485 | 6/1990 | Mori | 364/405 |
| 4,941,090 | 7/1990 | McCarthy | 364/405 |

FOREIGN PATENT DOCUMENTS

| 234402 | 6/1987 | European Pat. Off. |
| 253240 | 3/1988 | European Pat. Off. |
| 313376 | 7/1989 | European Pat. Off. |
| 0003310 | 6/1986 | World Int. Prop. O. |

Primary Examiner—Gail O. Hayes
Attorney, Agent, or Firm—Oblon, Spivak, McClelland, Maier & Neustadt

[57] ABSTRACT

A sales-data-processing apparatus having a storing device for storing rebate information or the equivalent thereof, an input device for entering a desired rebate which a customer wants to be refunded from the rebate, a subtracting device for subtracting the desired rebate from the total price of the current purchase, and a display device for displaying the result of the subtraction. The apparatus makes it possible to refund the desired rebate at each purchase.

11 Claims, 17 Drawing Sheets

FIG.7

| PLU NO | ARTICLE NAME | UNIT PRICE | WEIGHT | PRICE | FLAG |
|---|---|---|---|---|---|
| 1234 | PORK LOIN | 250 | 300 | 750 | 2 |

| TOTAL NUMBER | TOTAL PRICE |
|---|---|
| 3 | 2537 |

| PLU NO | UNIT PRICE (PRICE) | ARTICLE NAME | FLAG | TOTAL PRICE | TOTAL WEIGHT | TOTAL POINTS |
|---|---|---|---|---|---|---|
| 1234 | 250 | PORK LOIN | 2 | 57365 | 22938 | 72 |

FIG. 9

| CUSTOMER NUMBER | CUSTOMER CODE | ADDRESS | NAME | DATE OF BIRTH | AMOUNT ELIGIBLE FOR REBATE | REBATE(A) | REBATE(P) |
|---|---|---|---|---|---|---|---|
| 8765 | 00-1234-5678 | OTAKU ××× | MR. TARO TERAOKA | 30.10.10 | 15016 | 300 | 0 |

| PRESET-KEY NO. | PLU NO |
|---|---|
| 5 | 1234 |

27g

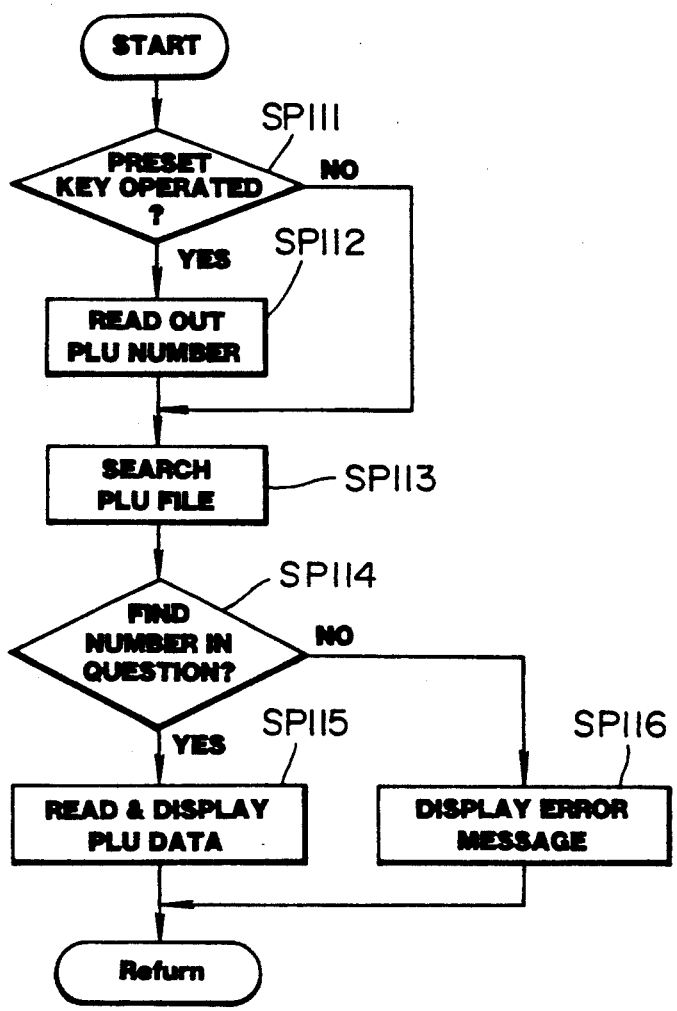

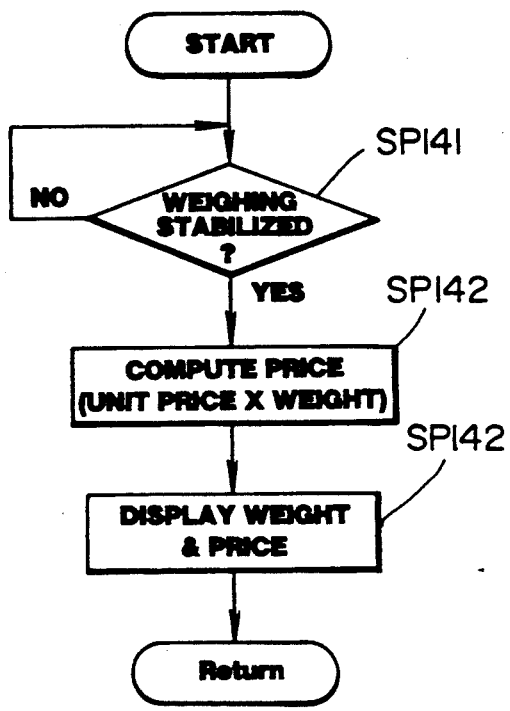

```
_____

CLERK NUMBER     A

TOTAL NUMBERS    3

TOTAL PRICE      2537
```

```
  x x x - - - -
  x x x x - - -
  x x x x - - -
_____
CUSTOMER     ┌─ ─ ─ ─ ─ ┐
  CODE       └─ ─ ─ ─ ─ ┘

TOTAL PRICE
                 2537
```

IMEGE OF INPUT-GUIDANCE SCREEN

| MR. TARO TERAOKA | |
|---|---|
| TOTAL PRICE | 2537 |
| REBATE | 300 |
| (CARRY-OVER | 0) |
| FINAL PRICE | 2237 |

| MR. TARO TERAOKA | |
|---|---|
| TOTAL PRICE | 250 |
| REBATE | 250 |
| (CARRY-OVER | 50) |
| FINAL PRICE | 0 |

| THANK YOU | |
|---|---|
| CHANGE | 500 |

PRINT EXAMPLE OF RECEIPT

```
SUPERMARKET ××
                OCTOBER 10TH, 1988
¥/100g      WEIGHT g     PRICE
BEEF LOIN
*    UNREBATED ITEM

× × ×      × × ×     1200
× × × × × × ×
    × × ×      × × ×      587
PORK LOIN
*    DOUBLE REBATE ITEM
    250        300        750
-------------------------------
TOTAL                    2537
REBATE                    -37
    FINAL
THREE ITEMS              2500
CASH TENDERED            3000
CHANGE                    500

CUSTOMER'S NAME    TARO TERAOKA

AMOUNT ELIGIBLE
   FOR REBATE            2087
```

SYSTEM FOR MAINTAINING CONTINUOUS TOTAL OF REFUND AMOUNTS DUE A CUSTOMER AND FOR ALLOWING CUSTOMER DESIGNATION OF THE AMOUNT OF REFUND TO BE APPLIED TO A PURCHASE

This application is a continuation of application No. 07/426,273, filed on Oct. 25, 1989, now abandoned.

BACKGROUND OF THE INVENTION

1. Field of the Invention

The present invention relates to a sales-data-processing apparatus with functions that can provide a rebate service in which a rebate amount is determined according to the wishes of the customers and the amounts purchased.

2. Prior Art

Two types of rebate services are carried out in customer-information-managing at present: the regular rebate system and the immediate rebate system. In the regular rebate system, service coupons are issued regularly depending on the amount purchased by a member customer, and a discount is made for the customer when the service coupons are brought in. Thus, the discount is carried out by means of service coupons. This system is inconvenient for both the customers and stores because the customers must keep and carry the service coupons and the stores must issue the service coupons.

In contrast, in the immediate rebate system, the rebate service is immediately carried out at the point of calculation according to the purchase amount of a customer. As a result, the stores need not issue the service coupons, and further the customers need not keep and carry the service coupons. These are advantages over the regular rebate system for both the customers and stores. In particular, the immediate rebate system is preferable for small-scale stores where the issuing of service coupons might be burdensome.

For this reason, sales-data-processing apparatuses adopting the immediate rebate system are now produced.

These sales-data-processing apparatuses works as follows: first, a check is made at the point of calculation to determine if the sum total of the purchases of the customer exceeds the amount at which a rebate will occur; second, if the rebate occurs, the final price obtained by subtracting the rebate from the current total price is required at the time of calculation.

The conventional sales-data-processing apparatus, however, presents some problems as follows:

(1) The rebate calculations often yield fractions of a yen, which causes a decrease in the processing efficiency of the store clerk. This is because the rebate is computed by multiplying the total price of purchase of the customer by a predetermined constant (2%, for example), when the total price exceeds a predetermined amount (¥10,000, for example).

(2) Some customers wish to delay the payment of the rebate until the rebate reaches a set amount, and then buy desired articles by using the rebate when the rebate reaches the set amount. The conventional sales-data-processing apparatus cannot handle such a demand.

(3) If the fractions of the total price of purchase were able to be paid by the rebate, the customer would not need to receive small change which is of little use, and the cash handling of the store clerk would be reduced as well. The conventional sales-data-processing apparatus cannot handle such a demand, either.

SUMMARY OF THE INVENTION

It is therefore an object of the present invention to provide a sales-data-processing apparatus which can record the total price of purchases eligible for rebate, and makes it possible for the customer to use the rebate when the rebate reaches an amount which the customer sets.

It is another object of the present invention to provide a sales-data-processing apparatus which makes it possible for the customer to transfer a fraction of the total price of purchase to the rebate so that the customer need not receive the fraction, which reduces the work of the store clerk, as well.

In one aspect of the present invention, there is provided a sales-data-processing apparatus comprising:

computing means for computing a potential rebate for each customer on the basis of the total price of articles which are purchased by the customer and are eligible for rebate;

storing means for storing the potential rebate or the total price from which the potential rebate is calculated for each customer;

primary input means for entering customer-identification data for identifying each customer;

primary display means for displaying the potential customer rebate according to the customer-identification data entered from the primary input means;

secondary input means for entering the rebate desired by the customer at the time of calculation;

subtraction means for subtracting the desired rebate from the total price of the current purchase so as to obtain the final price of the current purchase;

secondary display means for displaying the final price; and updating means for updating the storing means on the basis of the desired rebate and the total price of the articles eligible for rebate of the current purchase.

BRIEF DESCRIPTION OF THE DRAWINGS

FIG. 7 is a diagram showing the contents of receipt buffer 27d in FIG. 6;

FIG. 8 is a diagram showing the contents of PLU file 27e in FIG. 6;

FIG. 9 is a diagram showing the contents of customer file 27f in FIG. 6;

FIG. 10 is a diagram showing the contents of preset-key memory 27g in FIG. 6;

FIG. 12 is a flowchart showing the processes of reading and displaying of the article data;

FIG. 13 is a view showing an example of display of the article data;

FIG. 14 is a flowchart showing the processes of computation and display of the price and weight;

FIG. 15 is a view showing an example of display of the price and weight;

DESCRIPTION OF THE PREFERRED EMBODIMENTS

The invention will now be described with reference to the accompanying drawings.

Figure 1:
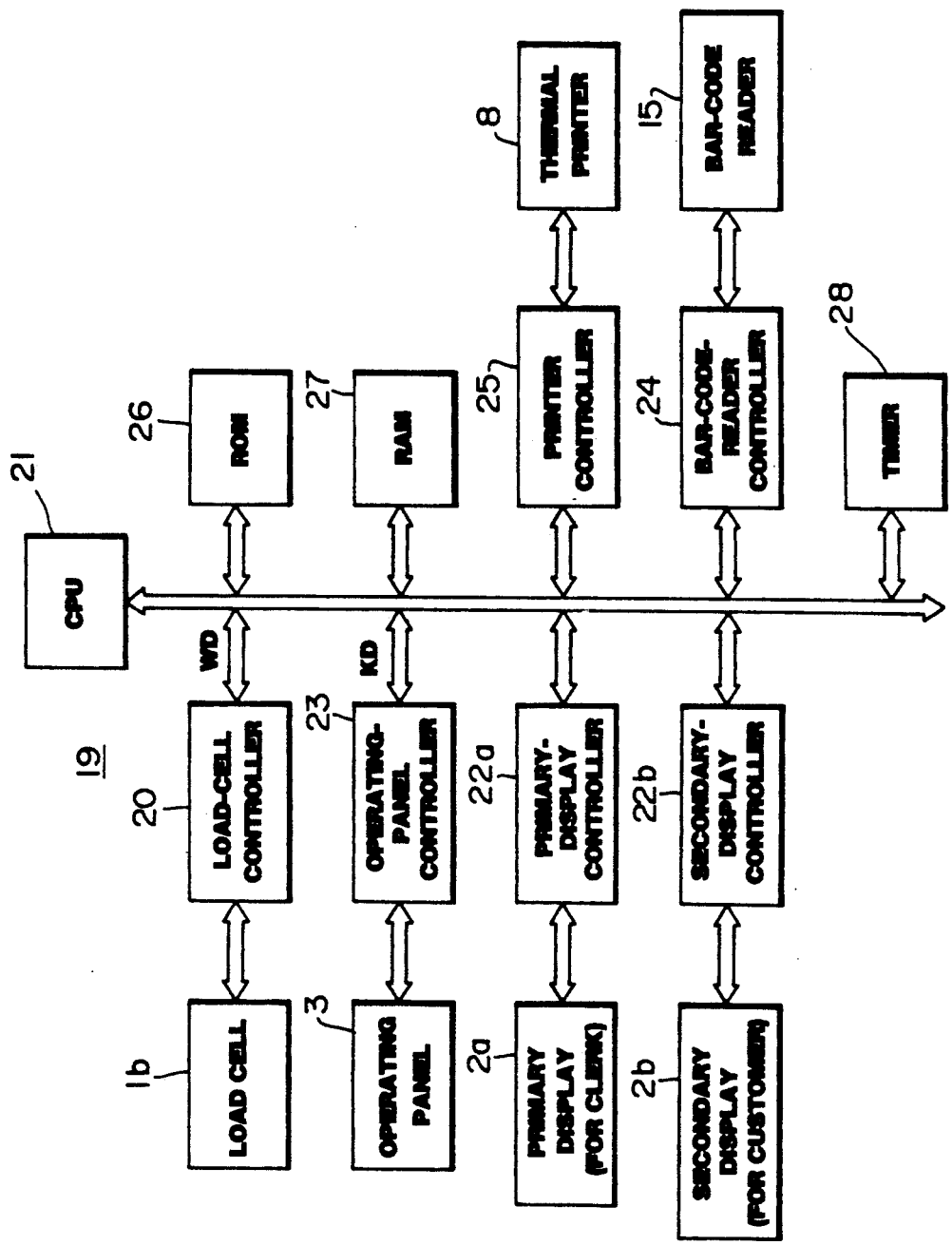
FIG. 1 is a block diagram showing the electric configuration of an electronic scale according to an embodiment of the present invention.
Figure 2:
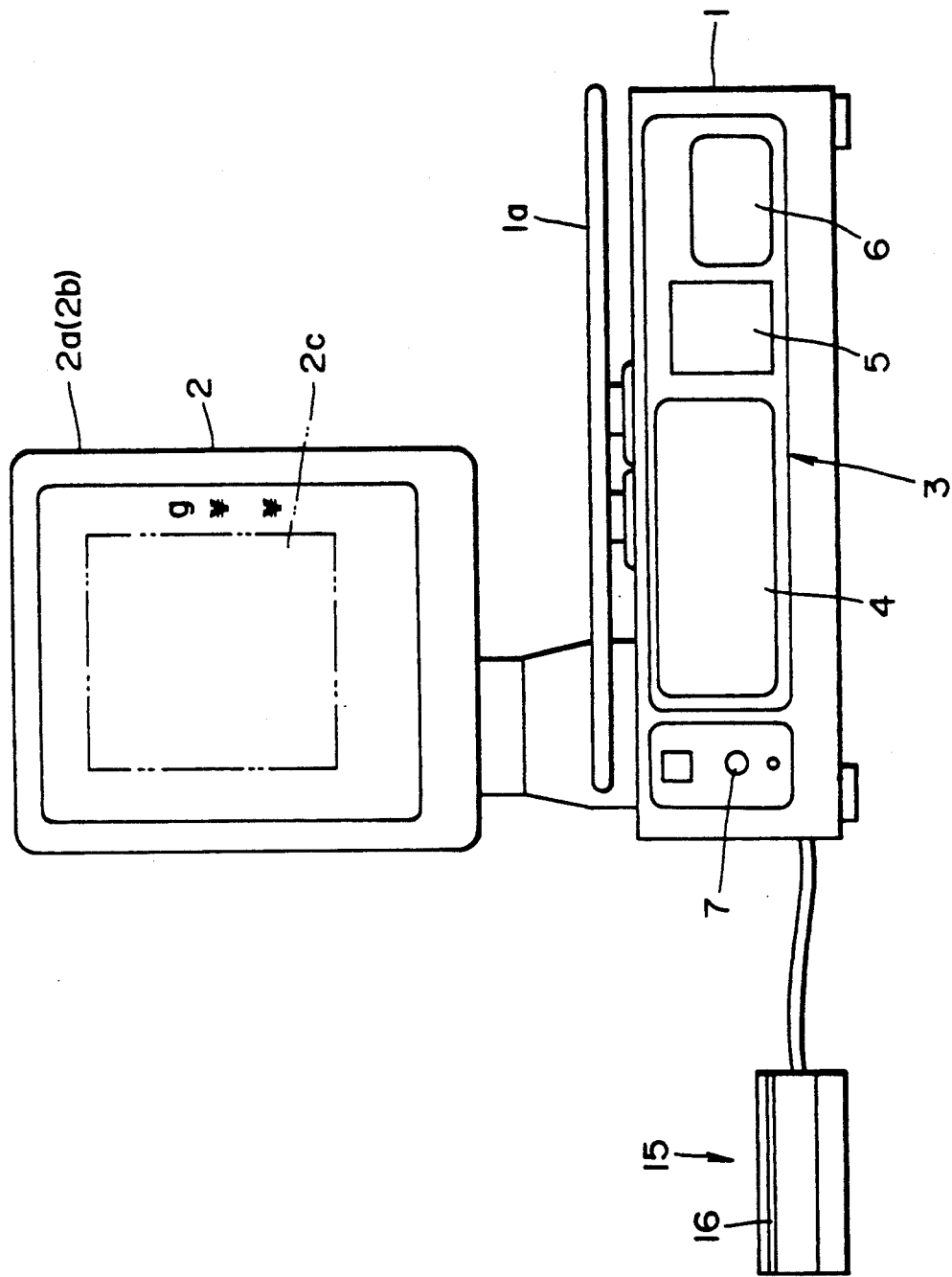
FIG. 2 is a front elevation showing the outer construction of the scale.
Figure 3:
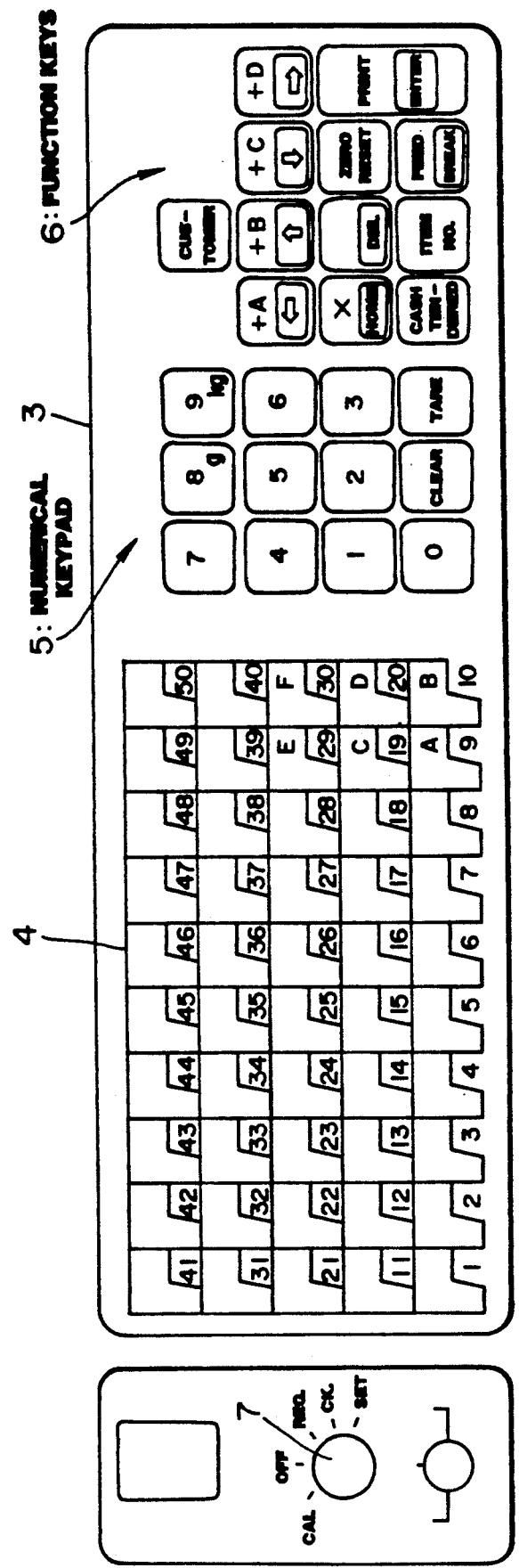
FIG. 3 is a front elevation showing the operating panel of the scale.

FIG. 1 is a block diagram showing the electric configuration of an electronic counter scale according to an embodiment of the present invention, FIG. 2 is a front elevation showing the outer construction of the scale, and FIG. 3 is a front elevation showing the operating panel of the electronic scale.

First, mechanical construction of the electronic scale will be described. In FIG. 2, numeral 1 designates a scale base on which scale plate 1a is provided. When an object to be weighed is positioned on scale plate 1, load cell 1b in FIG. 1 produces a weight signal. At the rear of scale base 1, stands double-screen display device 2. This display device 2 has two screens which are provided back to back: primary display 2a facing the clerk and secondary display 2b facing the customer. Each of displays 2a and 2b has a plasma-dot-display area 2c of 256×256 dots, and displays article name, weight (g), unit price (¥), price (¥), and so forth, in a calculation situation.

At the front of scale base 1 is provided operating panel 3 which is sloped so that the clerk can easily operate it. As shown in FIG. 3, operating panel 3 has preset keys 4, numeric keypad 5, function keys 6, key switches 7 for changing modes, and so on.

Preset keys 4 consist of 50 keys of 5 rows×10 columns, and are used to retrieve article data by pressing one of the keys. The article data includes the name, unit price, weight, etc. of the article, and are stored according to article numbers (called PLU number hereafter). Numerical keypad 5 is provided to enter various kinds of digital data, and function keys 6 are provided to enter various commands such as moving the cursor and editing data on the screens of display device 2. Keyswitch 7 is provided to select the current mode from among the modes such as setting, checking, registering, and issuing journal. A clear key and a tare key are also added to numerical keypad 5.

Figure 4:
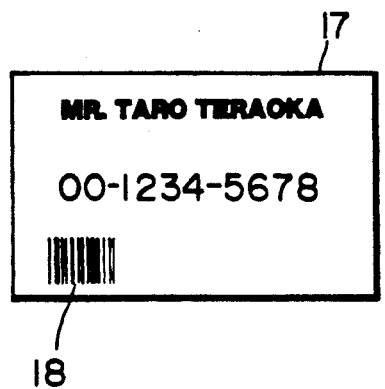
FIG. 4 is a front view showing a bar-code card used as a member identification card in the embodiment.

Inside the scale base 1, there is provided thermal printer 8 (see FIG. 1) which performs dot-printing on label paper or receipt paper by means of a thermal head so that desired characters and numerals are printed. Numeral 15 designates a bar-code reader for reading bar-code data, and numeral 16 denotes a guide groove for inserting bar-code card 17. Bar-code data is read when bar-code section 18 of bar-code card 17 shown in FIG. 4 is applied to the guide groove 16 and is slid therealong. This bar-code card 17 is used as a membership card on which a bar code corresponding to the membership number (customer number) is printed in bar-code section 18.

The electronic configuration in FIG. 1 will now be described:

Each of the elements described above is connected to controller 19 in FIG. 1. First, load cell 1b for weighing the article on scale plate 1a is connected to CPU 21 via load-cell controller 20. Second, primary display 2a is connected to CPU 21 via primary-display controller 22a, and secondary display 2b is connected to CPU 21 via second display controller 22b. Each of these display controllers 22a and 22b includes a display buffer memory so that the stored data in the buffer memory are displayed continually. Third, operating panel 3 is connected to CPU 21 via operating-panel controller 23, bar-code reader 15 is connected to CPU 21 via bar-code-reader controller 24, and thermal printer 8 is connected to CPU 21 via printer controller 25. Bar-code reader 15 is removably connected to the scale. Finally, ROM 26, RAM 27 and timer 28 are connected to CPU 21 which controls each part of the scale described above.

Figure 5:
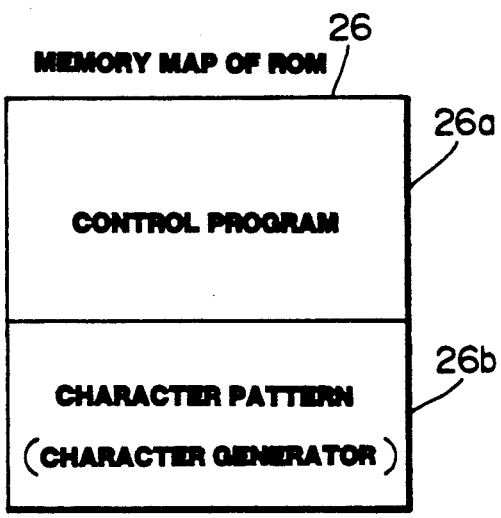
FIG. 5 is a map of data locations in ROM 26 in FIG. 1.

FIG. 5 is a map of data locations in ROM 26. ROM 26 includes area 26a and area 26b. Area 26a stores the control program for controlling weighing process, print process, display process, etc., and area 26b, which is usually termed the "character generator", stores character patterns including characters and numerals.

Figure 6:
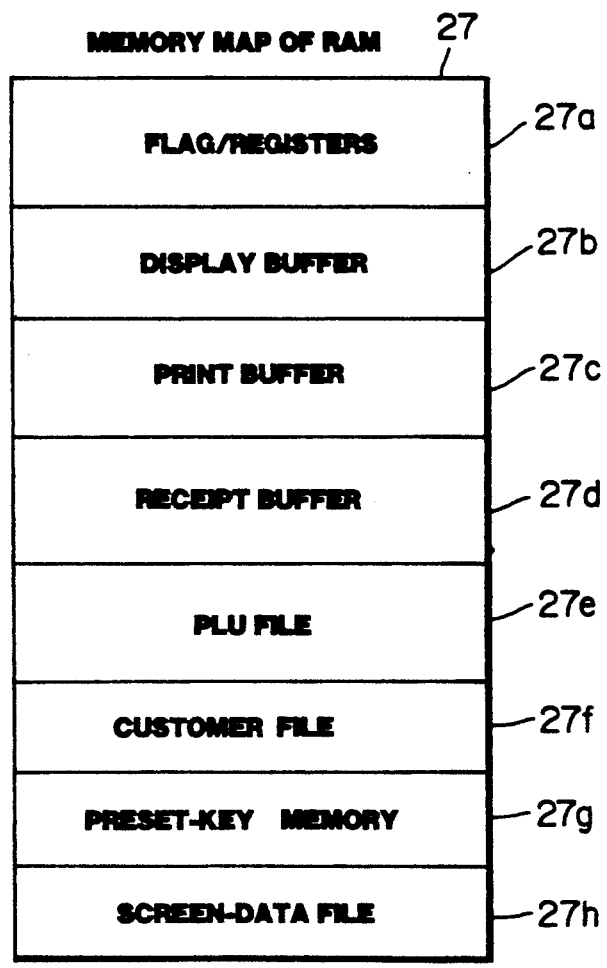
FIG. 6 is a map of data locations in RAM 27 in FIG. 1.

FIG. 6 is a map of data locations in RAM 27. RAM 27 includes working area 27a in which flags and registers are located, display buffer 27b in which display data are temporarily stored, print buffer 27c in which print data are temporarily stored, receipt buffer 27d in which receipt data are temporarily stored, PLU (Price Look Up) file 27e in which article data are stored, customer file 27f in which customer data are stored, preset-key memory 27g in which PLU numbers each of which corresponds to each preset-keys 4 are stored, and screen-data file 27h in which data for several screen images are stored.

FIG. 7 shows the configuration of receipt buffer 27d. Receipt buffer 27d temporarily stores receipt data when a clerk registers purchased articles. The receipt data includes such data as PLU numbers of purchased articles, article names, unit prices, weights, prices, flags, the total number of articles, and the total price. In this embodiment, 30 items of receipt data can be stored for each of four customers "A", "B", "C", and "D".

FIG. 8 show the configuration of PLU (Price Look Up) file 27e. This file 27e stores article data (such as unit prices of articles, article names, flags, total prices, total weights of the articles purchased, and total number of the articles purchased) in accordance with PLU numbers (article numbers). Among these data, unit prices, article names, and flags are set in advance as preset data. The flags represent the following: the articles corresponding to flags of "0" are not to be rebated; the articles corresponding to flags of "1" are to be normally rebated; and the articles corresponding to flags of "2" are to be rebated at twice the normal rebate.

FIG. 9 shows the configuration of customer file 27f. Customer file 27f stores customer date )such as customer codes, addresses, names, birth-dates, amounts eligible for rebate, rebates A, and rebates B) according to customer numbers. The amount eligible for rebate is equal to the total price of articles to be rebated, except that in case of the article for the double rebate, twice the price thereof is added to the amount eligible for rebate. Rebate A is the rebate yielded by the total price eligible for rebate of the last purchase, and rebate B is the carryover from the purchase before the last purchase.

FIG. 10 shows the arrangement of preset-key memory 27g, which stores PLU numbers according to preset-key numbers. Finally, screen-data file 27h stores a guidance-screen image and a service-screen image to be displayed on the displays 2a and 2b.

Figure 11:
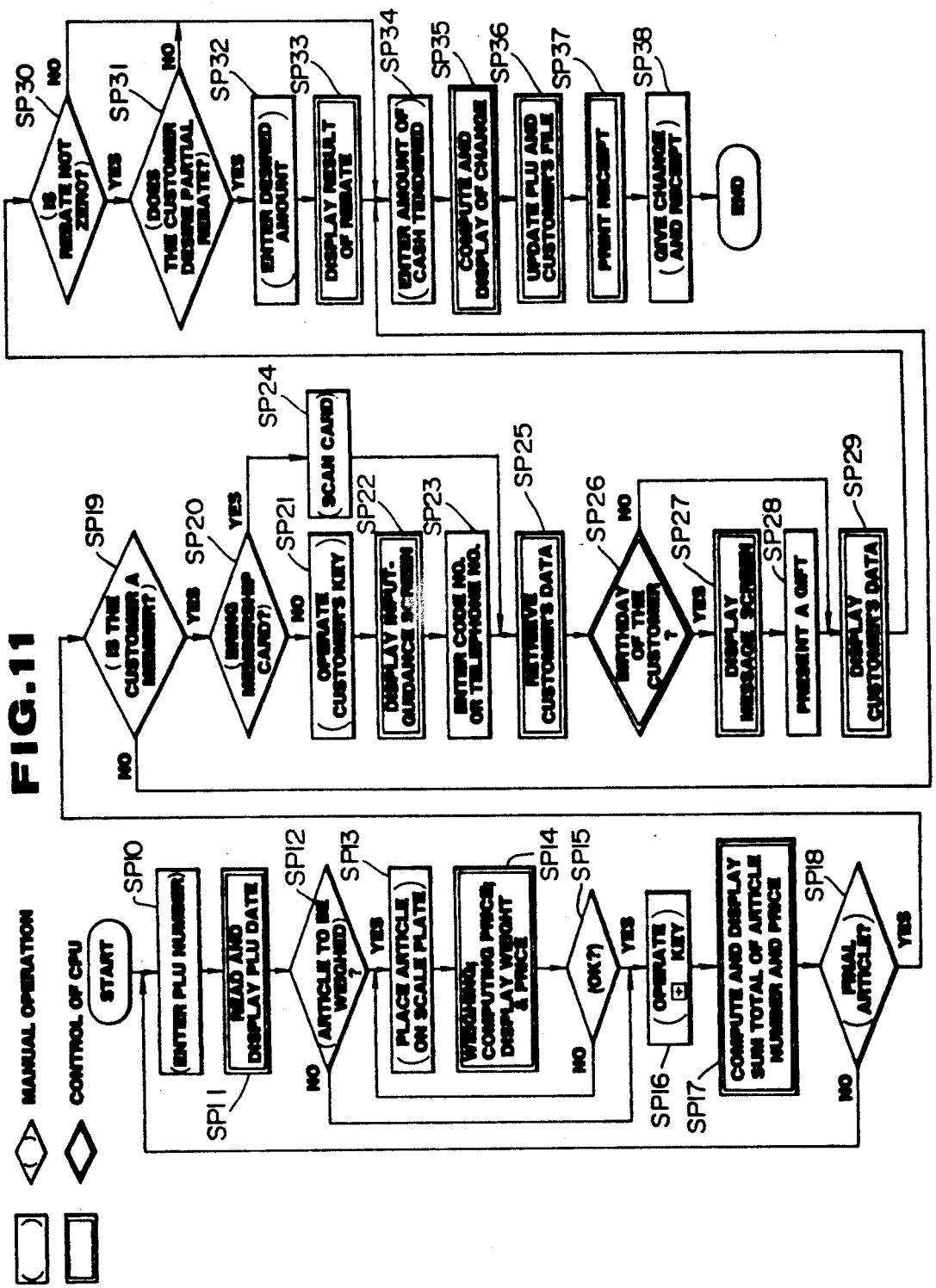
FIG. 11 is a flowchart showing the order of the operations in the embodiment of registering, calculating, and immediately rebating.

Next, the register-and-calculation process and the immediate rebating process will be described with reference to the flowchart shown in FIG. 11.

STEP SP10

A clerk enters the PLU number of an article which a customer desires to buy: for example, the PLU number of "pork loin". When the PLU number of "pork loin" can be entered from one of preset-keys 4, the clerk presses the key associated with "pork loin" so that the PLU number KD thereof is entered. In contrast, when the entry by means of preset keys 4 is impossible, the clerk enters the PLU number by operating the item-number key of function keys 6, and then numerical keypad 5.

STEP SP11

When CPU 21 receives PLU number data KD via operating-panel controller 23, CPU 21 reads out and displays the article data according to the process shown in FIG. 12, First, at step SP111 in FIG. 12, CPU 21 tests if one of the preset keys 4 is pressed or not, i.e., whether a PLU number is entered from preset keys 4 or not. If the test result is positive (YES), CPU 21 proceeds to step SP112. At step SP112, CPU 21 searches preset-key memory 27g in order to find the PLU number corresponding to the depressed key. After finding the PLU number, CPU 21 reads the PLU number, and proceeds to step SP113. In contrast, when a PLU number is directly entered by using function keys 6 and numerical keypad 5, the test result at step SP111 is negative (NO). In this case, CPU 21 directly proceeds to step SP113. At step SP113, CPU 21 searches PLU file 27e to find the PLU number, and at step SP114, CPU 21 tests if the PLU number entered is found in PLU file 27e. If the test result at step SP114 is positive (YES), CPU 21 proceeds to step SP115 to read the article data associated with "pork loin" from PLU file 27e, and displays the article data on primary display 2a and secondary display 2b. FIG. 13 shows an example of the article data of "pork loin" displayed. As shown, price per 100 g, in addition to the weight, and the total price, is displayed. If the test result at step SP114 is negative (NO), CPU 21 proceeds to step SP116 and displays an error message to indicate that the PLU number entered has not been found in PLU file 27e.

STEP SP12

The clerk decides whether the article which the customer desires to buy is an article to be weighed or not. If the article is to be weighed, CPU 21 proceeds to step SP13, whereas if the article does not need to be weighed, that is, if the article has a definite price, CPU 21 proceeds to step SP16.

STEP SP13

When the article which the customer wants to buy is an article to be weighed, the clerk puts the article on scale plate 1a, thereby weighing the article. During the weighing, load cell 1b produces weight data WD and sends it to CPU 21 via load-cell controller 20.

STEP SP14

CPU 21, receiving weight data WD via load-cell controller 20, computes the price of the article and displays the weight and price according to the processes shown in FIG. 14. First, at step SP141 in FIG. 14, CPU 21 waits until weight data WD stabilizes. Once weight data WD stabilizes CPU 21 proceeds to step SP142 so as to compute the price of "pork loin" on scale plate 1a by multiplying the unit price of the "pork loin" by weight data WD (300 g, for example). After that, CPU 21 proceeds to step SP143, thereby displaying the weight, unit price and total price of the "pork loin" on primary display 2a and secondary display 2b. FIG. 15 shows an example of the display at step SP143. As shown, the item name "pork loin", its weight (300 g, for example), its price per 100 (¥250, for example), and its price (¥750, for example) are displayed.

STEP SP15

When the weight of the article on scale plate 1a reaches the weight which the customer desires, the processing proceeds to step SP16. In contrast, when the weight of the article on scale plate 1a is not equal to that which the customer desires, the processing returns to step SP13. In this case, when the weight of the article on scale plate 1a is less than the desired weight, more of the article must be added, whereas if the weight of the article on scale plate 1a exceeds the desired weight, the excess must be removed.

STEP SP16

The clerk presses [+A] key of function keys 6 so as to command addition. Incidentally, 4 addition keys, i.e., [+A] key, [+B] key, [+C] key, and [+D] key are provided in this apparatus. This makes it possible for each of four customers A, B, C and D to serve respective customers simultaneously. In this description, however, the case where one clerk serves one customer is explained.

STEP SP17

Figures 16, 17, 18:
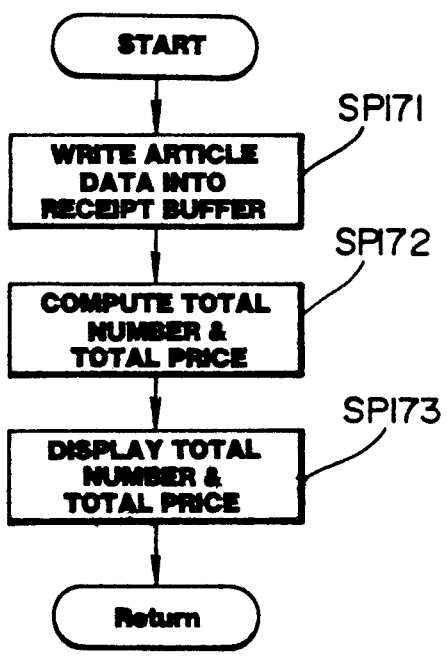
FIG. 16 is a flowchart showing the processes of computation and display of the total price.
FIG. 17 is a view showing an example of display of the total price.
FIG. 18 is a view showing an example of the image of input-guidance screen.

When CPU 21 receives a signal from [+A] key, CPU 21 computes the total price and displays it according to the processes shown in FIG. 16. First, at step SP171 in FIG. 16, CPU 21 transmits the receipt data (that is, the current article data) shown in FIG. 7 to receipt buffer 27d. Second, at step SP172, CPU 21 computes the total price and the number of items of the current purchase of the customer. The number of items (for example, 3) represents the number of repetition of step SP16, that is, the number of depressions of the [+A] key. Finally, at step SP173, CPU 21 stores the computed total price to receipt buffer 27e, and controls the display of the total price on primary and secondary displays 2a and 2b.

FIG. 17 shows an example of the display: the total price, "¥2537", for example, is displayed together with the clerk number A, and the total number of items (3, for example).

STEP SP18

If there are other articles to be purchased by the customer, the processing returns to step SP10 to repeat the above processes in connection with the article to be purchased. In contrast, if there are no other articles, the clerk asks the customer if it is all right to execute the calculation, and proceeds to step SP19 if the customer gives a positive answer.

STEP SP19

The clerk asks if the customer is a member of the store. When the customer answers that he/she is a member, the processing proceeds to step SP20, whereas if the customer answers that he/she is not a member, the processing proceeds to step SP34.

The following steps SP20 to SP33 relates to the situation in which the customer is a member.

STEP SP20

The clerk asks the customer if he has his membership card. If the customer brings his membership card, the processing proceeds to step SP24, whereas if the customer does not have his membership card, the processing proceeds to step SP21.

STEP SP21

The clerk depresses the "customer" key of function keys 6.

STEP SP22

CPU 21, receiving a signal from the "customer" key, retrieves input-guidance-screen image shown in FIG. 18 from screen-data file 27h, and displays the image on primary and secondary displays 2a and 2b. On the input-guidance screen, instructions indicating the input processes are displayed: for example, "Please enter the customer code from the numerical keypad and then press the "customer" key". Otherwise, "Please enter the telephone number of the customer and then press the [↑] key".

STEP SP23

The clerk asks and enters the customer code or the telephone number of the customer according to the processes displayed on the input-guidance screen.

STEP SP24

When the customer brings a membership card, the clerk receives the membership card from the customer and has bar-code reader 15 read the customer number (bar-code data) on the card at step SP24. If the reading of the customer number is impossible because of deformity or breakage of the card, the clerk executes the processes of step SP21 to step SP23.

STEP SP25

Figure 19:
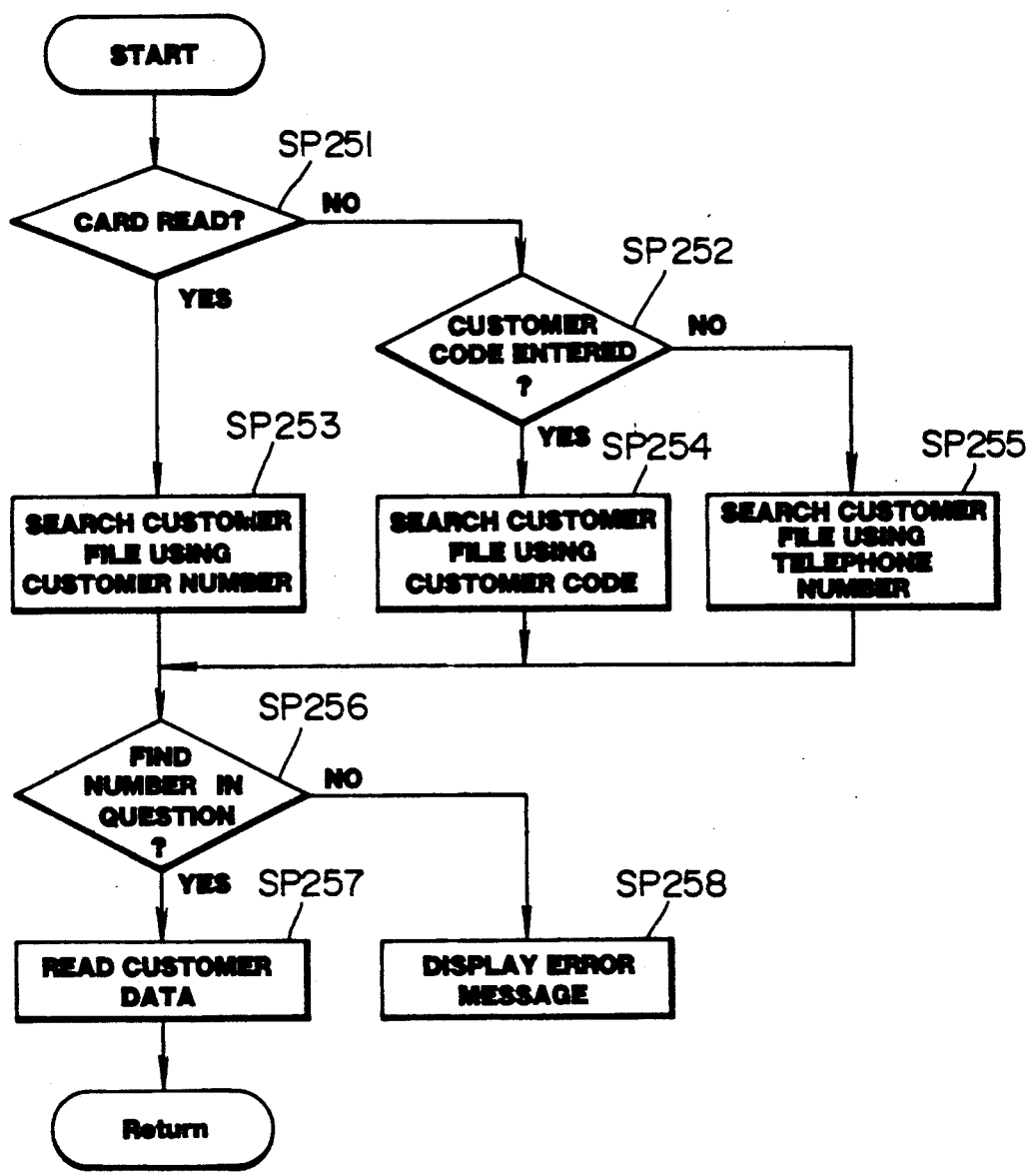
FIG. 19 is a flowchart of the processes of reading customer data.

CPU 21 reads out the customer data from customer file 27f according to the processes shown in FIG. 19, when CPU 21 receives the customer code read at step SP24, or the customer code entered at step SP23, or the telephone number of the customer entered at step SP23.

More specifically, at step SP251 in FIG. 19, CPU 21 tests if the membership card is read. If the test result is positive (YES), CPU 21 proceeds to step SP253 at which CPU 21 searches customer file 27f by using the customer number so as to obtain the customer data. On the other hand, if the test result at step SP251 is negative (NO), CPU 21 proceeds to step SP252 at which CPU 21 tests if the customer code is entered. If the test result at step SP252 is positive (YES), CPU 21 proceeds to step SP254 at which CPU 21 searches customer file 27f so as to obtain the customer data including the customer code. In contrast, when the test result at step SP252 is negative (NO), that is, the telephone number of the customer is entered, CPU 21 proceeds to step SP255 at which CPU 21 searches customer file 27f so as to obtain the customer data including the telephone number. After the search above, CPU 21 tests, at step SP256, if the customer data in question is found or not. If the test result at step SP256 is positive (YES), CPU 21 proceeds to step SP257 at which the found customer data is read out. On the other hand, if the test result at step SP256 is negative (NO), CPU 21 proceeds to step SP258 and displays the error message.

STEP SP26

Figure 20:
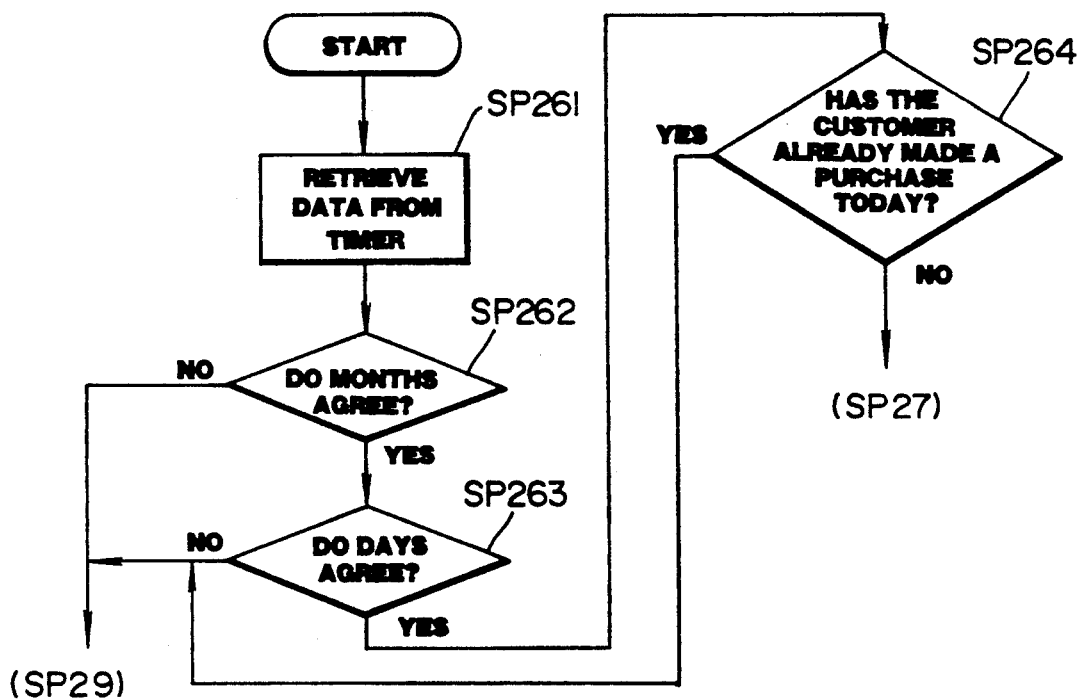
FIG. 20 is a flowchart of the processes of identifying the birthday of a customer.

At step SP26, CPU 21 tests whether today is the birthday of the customer or not according to the processes shown in FIG. 20.

At step SP261 in FIG. 20, CPU 21 reads the date of today from timer 28. At step SP262, CPU 21 compares the "month" of the data read from timer 28 with the "month of the date of birth" of the customer data. If the test result is negative (the months do not agree), CPU 21 proceeds to step SP29 in FIG. 11, whereas if the test result is positive (the months agree), CPU 21 proceeds to step SP263 at which CPU 21 compares the "day" of the data read from timer 28 with the "day of the date of birth" of the customer data. If the test result at step SP263 is negative, CPU 21 proceeds to step SP29 in FIG. 11, whereas if the test result at step SP263 is positive, CPU 21 proceeds to step SP264 at which CPU 21 test if the customer has already made a purchase today. If the test result at step SP264 is positive (YES), CPU 21 proceeds to step SP29 in FIG. 11, whereas if the test result at step SP264 is negative, CPU 21 proceeds to step SP27 in FIG. 11. The decision whether the customer has already made a purchase and so accepted the birthday service today or not is carried out by storing his customer number in a predetermined location.

STEP SP27

Figure 21:
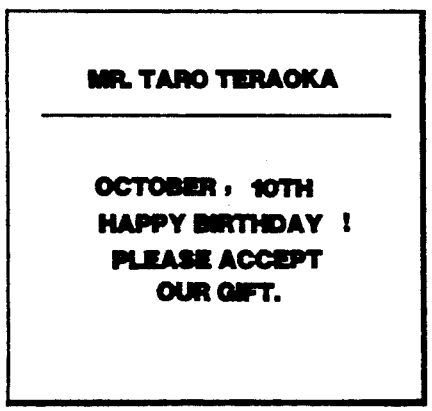
FIG. 21 is a view showing an example of service messages of a birthday.

CPU 21 reads birthday-service-message-screen image shown in FIG. 21 from screen-data file 27h, ad displays the image on primary and secondary displays 2a and 2b for a predetermined period. In addition, CPU 21 sounds a buzzer or produces computer-synthesized voices.

STEP SP28

The clerk presents a gift (a birthday present) to the customer for whom the birthday service message is displayed.

STEP SP29

Figure 22:
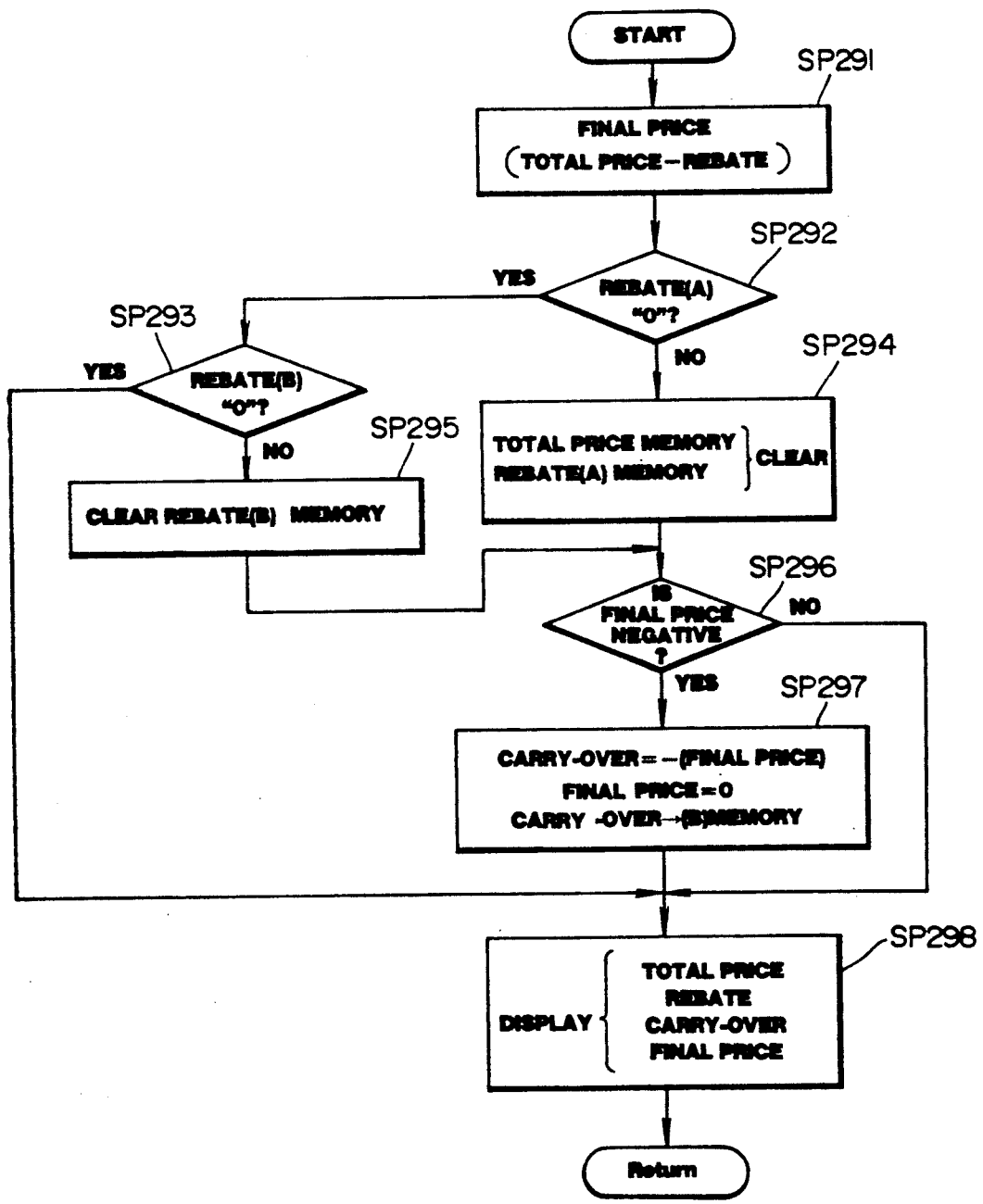
FIG. 22 is a flowchart showing the processes of computation and display of customer's data.

At step SP29, CPU 21 computes and displays the customer data according to the processes shown in FIG. 22. First, at step SP291 in FIG. 22, CPU 21 computes the final price of the purchased articles by subtracting the rebate of the customer from the total price (in this case ¥2537), and stores the result into the final-price register. The rebate here is obtained by adding rebate A and rebate B of the customer data. Second, at steps SP292 and SP293, the amounts of rebate A and rebate B are tested whether they are zero or not. If the rebate A is not zero, for example, ¥300, CPU 21 proceeds from step SP292 to step SP294 at which CPU 21 clears the amount-eligible-for-rebate memory and the rebate (A) memory in customer file 27f to zero. This clearing is performed for the preparation of writing a new rebate (A) based on the current purchase (see step SP369 in FIG. 29). On the other hand, if rebate A is zero and rebate B is not zero, CPU 21 proceeds to step SP295 through steps SP292 and SP293, and clears the rebate (B) memory in customer file 27f. This clearing is performed for the preparation of writing a new rebate (B) which is a carry-over to the next purchase (see step SP297 in FIG. 22). If both the rebate A and rebate B are zero, CPU 21 directly proceeds to step SP298 through steps SP292 and SP293, and displays the total price, rebate, carry-over, and final price.

After clearing the memories at step SP294 or at step SP295, CPU 21 proceeds to step SP296 at which CPU 21 tests if the computed final price is negative or not. If the final price is negative, CPU 21 proceeds to step SP297 so as to store the absolute value of the final price (i.e., carry-over) into the carry-over register and clear the content of the final-price register. After the CPU 21 transfers the content of the carry-over register to the rebate (B) memory in customer file 27f, and proceeds to step SP298 at which CPU 21 displays the total price, rebate, carry-over, and final price on primary display 2a and secondary display 2b. When the test result at step SP296 is negative (NO), that is, when the final price is positive, CPU 21 directly proceeds to step 298, and displays the data.

Figures 23, 24, 27, 28:
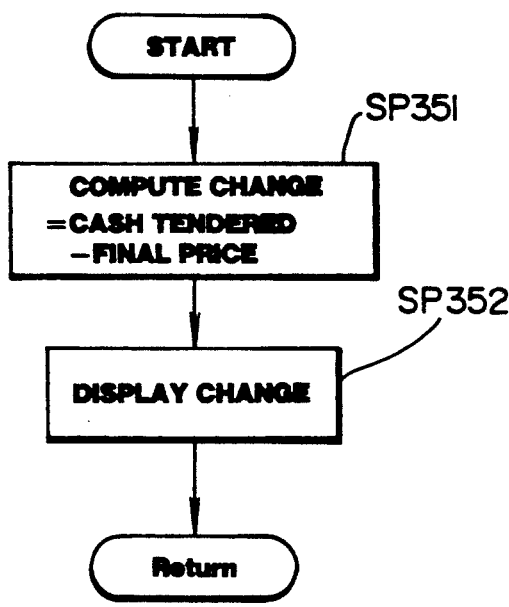
FIG. 23 and FIG. 24 are views each of which shows an example of display of customer's data.
FIG. 27 is a flowchart showing the processes of computation and display of a change.
FIG. 28 is a view showing an example of display of the change.

FIG. 23 and FIG. 24 show examples of the display: FIG. 23 is an example when the final price is positive; while FIG. 24 is an example when the final price is negative. In the example in FIG. 23, the total price is ¥2537, the rebate is ¥300, the carry-over is ¥, the final price is ¥2237. On the other hand, in the example in FIG. 24, the total price is ¥250, the rebate is also 250, the carry-over is ¥50, and the final price is ¥0.

STEP SP30

The clerk decides if the rebate is zero or not by viewing the rebate of the displayed customer data. If the clerk determines that the rebate is not zero, the processing proceeds to step SP31, whereas if the rebate is zero, the processing proceeds to step SP34. In this case, since the rebate is ¥300, the processing proceeds to step SP31.

STEP SP31

The clerk asks the customer if the customer desires the total rebate or a partial rebate. If the customer desires the total rebate, the processing proceeds to step SP34. In contrast, if the customer desires a partial rebate, the processing proceeds to step SP32.

STEP SP32

The clerk enters the desired amount of rebate by operating numerical keypad 5 and the "tendered" key of function key 6. The desired amount of rebate is stored into the entered-amount register. Here, let us assume that the desired amount of rebate of the customer is ¥37, which is a fraction of the total price of ¥2537.

STEP SP33

Figures 25, 26:
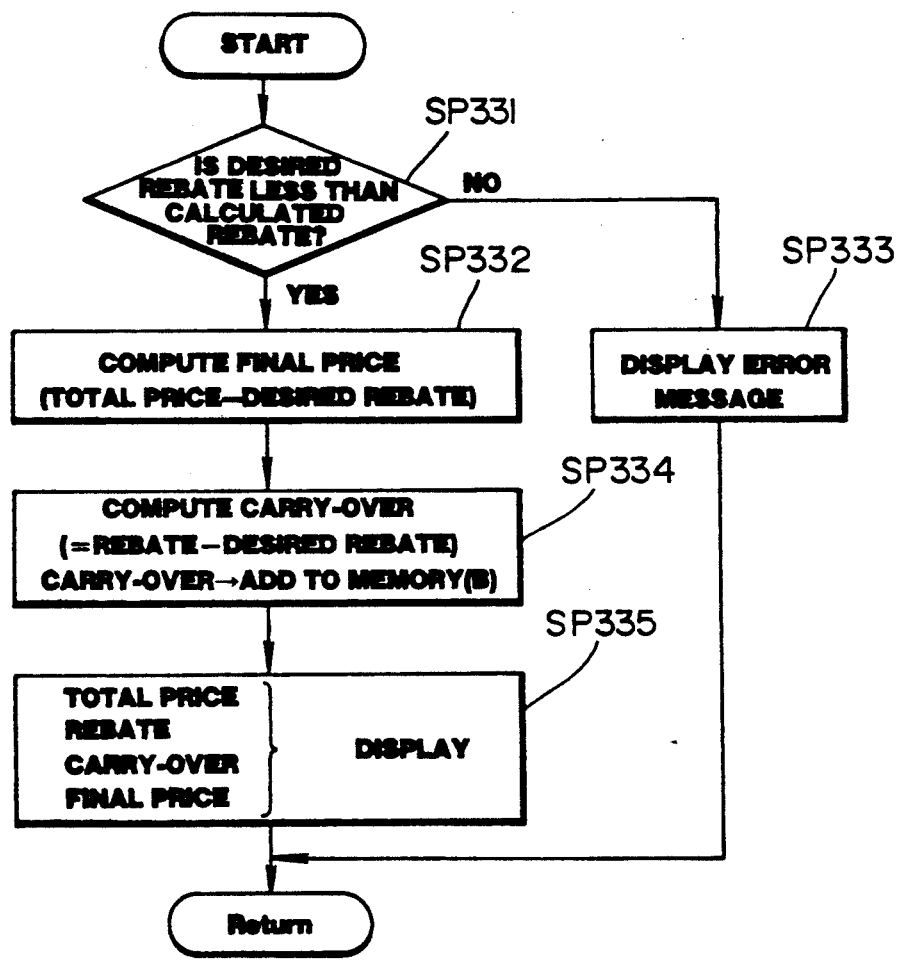
FIG. 25 is a flowchart showing the processes of display of the result of rebate.
FIG. 26 is a view showing an example of the display of the result of rebate.

At step SP33, CPU 21 displays the result of the rebate according to the processes shown in FIG. 25. First, at step SP331, CPU 21 determines if the desired amount of rebate is less than the calculated rebate. In this example, since the desired amount of rebate (¥37) is less than the calculated rebate (¥300), CPU 21 proceeds to step SP332, and subtracts the desired amount of ¥37 from the total price of ¥2,537. When the resultant amount (final price of ¥2,500) is obtained, the content of the final-price register is updated to the final price of ¥2,500. Second, at step SP334, the desired amount of rebate (¥37) is subtracted from the calculated rebate (¥300). When the resultant rebate (¥263) is obtained, the content of the carry-over register is updated to the resultant amount (¥263). Then the content of the rebate (B) memory of customer file 27f and the content of the carry-over register are added, and the result of the addition is written into the rebate (B) memory. Finally, at step SP335, CPU 21 displays the total price, rebate, carry-over, and final price in primary display 2a and secondary display 2b. FIG. 26 is an example of the display. In this case, the total price is ¥2,537, the rebate is ¥37, the carry-over is ¥263, and the final price is ¥2,500. Incidentally, if the test result at step SP331 is negative, that is, if the desired amount of rebate is greater than the calculated rebate, CPU 21 proceeds to step SP333, and an error message is displayed.

STEP SP34

The clerk informs the customer of the final price. When the clerk receives the cash from the customer, he enters the amount of cash tendered, for example, ¥3,000 and presses the "PRINT" key.

STEP SP35

At step SP35, CPU 21 computes and displays the change according to the processes shown in FIG. 27. First, at step SP351, CPU 21 subtracts the final price (¥2,500) from the amount of cash tendered (¥3,000), so that the amount of change (¥500) is obtained. Then, at step SP352, CPU 21 displays the amount of change. FIG. 28 is an example of the display.

STEP SP36

Figure 29:
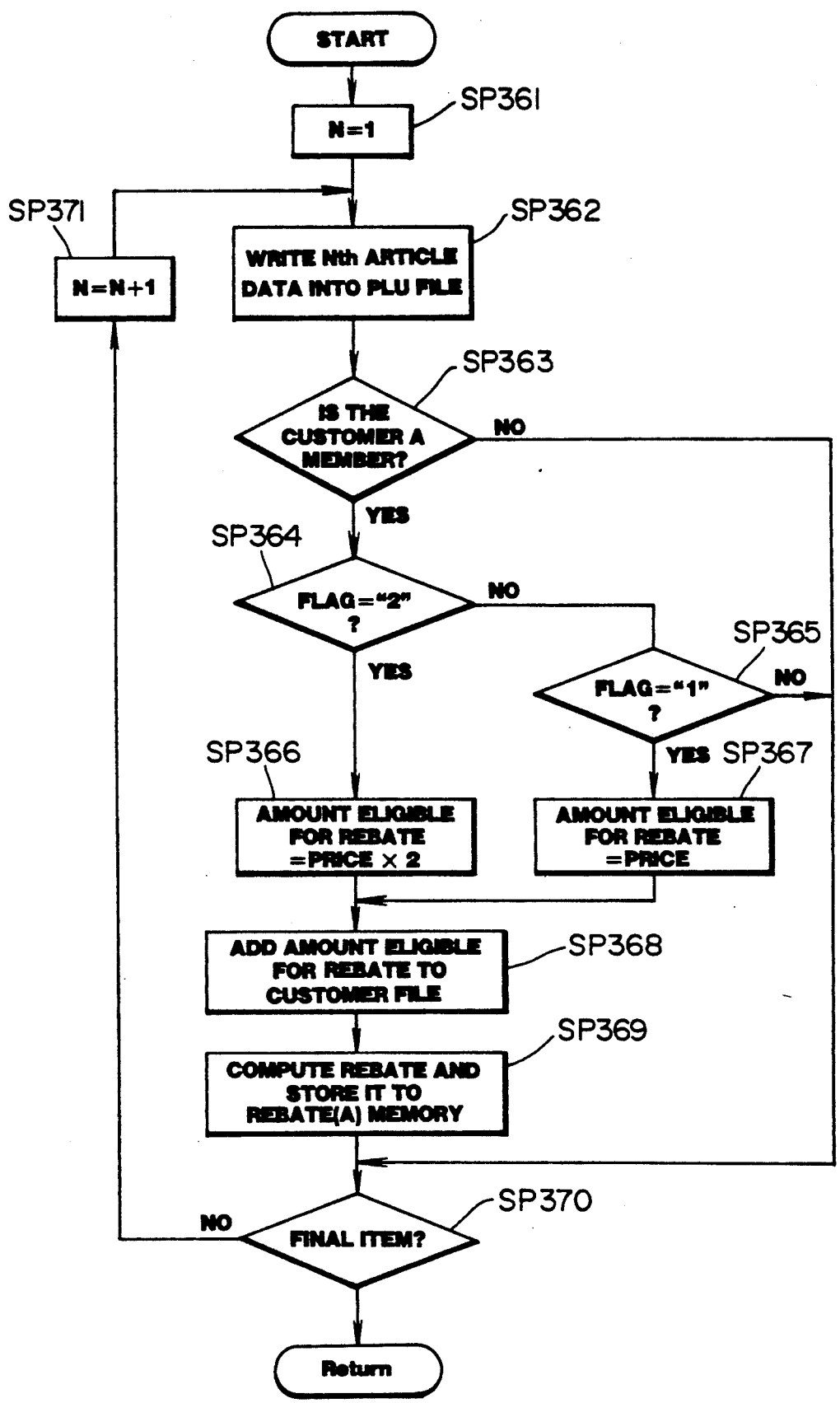
FIG. 29 is a flowchart showing the update process of the content of the PLU file and customer file.

At step SP36, CPU 21 updates the article data in PLU file 27e and the rebate (A) data in customer file 27f on the basis of each receipt item of the current purchase according to the processes shown in FIG. 29. First, at step SP361, CPU 21 initializes receipt-data-retrieval number N to "1". Second, at step SP362, CPU 21 reads the first receipt data in receipt buffer 27d, and then reads PLU data from PLU file 27e by using PLU number in the retrieved receipt data. The PLU data includes the unit price, the total price, the total weight, and the like, of the article. Then, CPU 21 adds the price in receipt data to the total price in PLU file 27e, and also adds the total weight in receipt data to the total weight data in PLU file 27e, thereby updating the total price and the total weight in PLU file 27e.

At step 363, CPU 21 tests if the customer is a member of the store. If the test result is negative (NO), CPU 21 proceeds to step SP370, while if the test result is positive (YES), CPU 21 proceeds to step SP364. At step SP364, CPU 21 tests if the article is eligible to double rebate or not on the basis of a flag included in receipt data. If the flag is "2", CPU 21 proceeds to step SP366 and multiplies the price of the article by "2". The resultant product is a new increase in the amount eligible for rebate (A). On the other hand, if the flag is "1", CPU 21 proceeds from step SP365 to step SP367. In this case, the price of the article is a new increase in the amount eligible for rebate (A). IF the flag is "0", this means that the article is not eligible for rebate, and so CPU 21 directly proceeds from step SP365 to step SP370 without executing the processes for rebate.

After the new increase in the amount eligible for rebate is determined at step SP366 or step SP367, CPU 21 proceeds to step SP368 at which CPU 21 reads out the amount eligible for the rebate in customer file 27f, and adds the new increase in the amount eligible for rebate to the read out amount eligible for the rebate, thus obtaining the updated amount eligible for rebate, which is written into customer file 27f as the new amount eligible for the rebate.

At step SP369, CPU 21 calculates a new rebate on the basis of the new amount eligible for rebate, and writes the new rebate (rebate A) into the rebate (A) memory in customer file 27f. The rebate A can be calculated by using a fixed amount method or a fixed ratio method. According to the fixed amount method, a rebate of a fixed amount is discounted: for example, a rebate of ¥1,000 is discounted for every ¥50,000 of the amount eligible for rebate. On the other hand, according to the fixed rate method, a rebate is determined as follows: for example, when the amount eligible for rebate is less than ¥10,000, the rebate is 0% of the amount; when the amount eligible for rebate is more than ¥10,000 and less than ¥20,000, the rebate is 1% of the amount; and when the amount eligible for rebate is more than ¥20,000, the rebate is 2% of the amount. At step SP370, CPU 21 tests if the number N is the last number or not. If the number N is the last number, CPU 21 terminates the update processes of step SP36. On the other hand, if the number N is not the last number, CPU 21 proceeds to step SP371 to increment the number N by "1", and returns to step SP362 so as to repeat the processes above on the next receipt data. The processes above is repeated until the last number is reached, thus completing the updating processes at step SP36.

STEP SP37

Figures 30, 31:
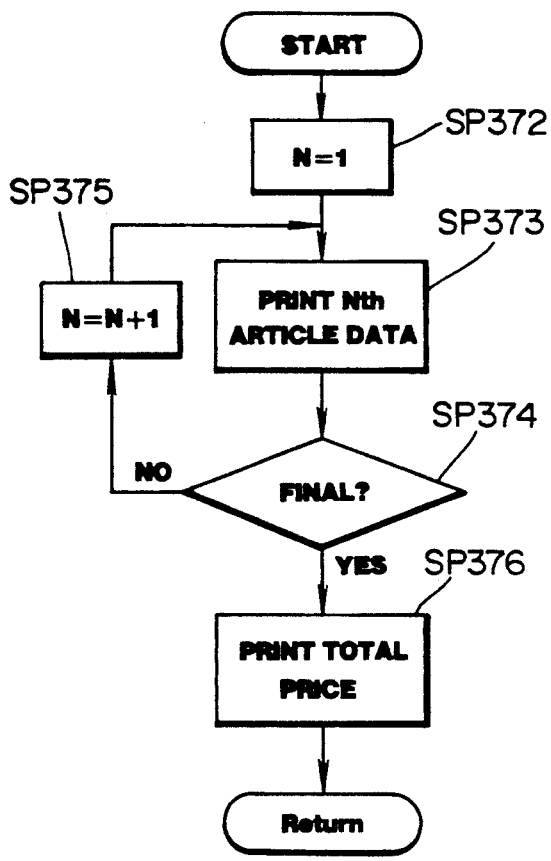
FIG. 30 is a flowchart showing the processes of receipt printing.
FIG. 31 is a view showing an example of the receipt printed.

At step SP37, CPU 21 prints a receipt according to the processes shown in FIG. 30. First, at step SP372 in FIG. 30, CPU initializes the retrieval number N of receipt data to "1". Second, at step SP373, CPU 21 reads out the first receipt data in receipt buffer 27d, and transfers the article data such as "article name", "weight", and "price" in the receipt data to print buffer 27c in order to print the article data on receipt paper by means of thermal printer 8. When printing has been completed, the article data in receipt buffer 27d is cleared. At step 374, CPU 21 tests if the retrieval number N is the last number or not: if the retrieval number is the last number, CPU 21 terminates the printing process at step SP37; on the other hand, if the retrieval number N is not the last number, CPU 21 increments the retrieval number by "1" at step SP375, and returns to step SP373. Thus, the processes above are repeated with regard to the next receipt data until the last data is reached. When the last data is reached at step SP374, CPU 21 proceeds to step SP376 and transfers "total price", "rebate", "cash tendered", "change" and "customer name" to print buffer 27c, so that these data are printed out on a receipt paper by means of thermal printer 8. FIG. 31 shows a printed example at step SP376.

STEP SP38

The clerk hands the customer the change and receipt. Thus, all the processes are completed.

According to the embodiment, a desired amount of rebate less the possible amount of the customer's rebate can be specified by the customer so that the desired amount is discounted from the total price of the current purchase. For example, the customer can specify the amount of rebate equal to the fraction of the price. Thus, the clerk as well as the customer can be freed from the tedious handling of small change, thereby speeding up the sale. Moreover, if the total price is less than the potential rebate, the total price can be rebated.

Incidentally, the rebates A and B above are provided for the following reason:

A rebate is generally calculated by multiplying the total price of the articles eligible for rebate by a predetermined rate which varies according to the total price. For example, the rate is 0% when the total price eligible for rebate is less than ¥10,000, the rate is 1% when the total price is more than ¥10,000 and less than ¥20,000, and the rate is 1.5% when the total price is more than ¥20,000. If the total price eligible for rebate is ¥15,000, the rebate of ¥150 is given accordingly. If the customer uses ¥100 out of this rebate of must be carried over. This carry-over must be stored by some means. For example, the carry-over of ¥50 may be stored in the form of the price eligible for rebate, after the rebate is converted into the price: the carry-over of ¥50 is converted into the price of ¥5,000, and the ¥5,000 is stored. This presents a problem that the inverse conversion gives a rebate of ¥0 because when the price is ¥5,000, the rate is 0%. To avoid such a problem the following means can be taken:

(a) In addition to rebate A which is calculated from the total price eligible for rebate of the current purchase, the carry-over of ¥50 is stored as rebate B as in the embodiment above. This makes it possible to record rebate B in its original form.

(b) Rebate A need not be stored if the total price eligible for rebate is stored as in (a) above.

(c) Instead of storing rebates A and B, the sum total of rebates A and B may be stored.

The embodiment above stores rebate A and rebate B in addition to the total price eligible for rebate. This makes it possible to display or print these three items without calculation, facilitating the display or printing.

Although a specific embodiment of a sales-data-processing apparatus constructed in accordance with the present invention has been disclosed, it is not intended that the invention be restricted to either the specific configurations or the uses disclosed herein. Modifications may be made in a manner obvious to those skilled in the art. For example, the following modifications can be made:

(1) Although the amount eligible for rebate in the above embodiment does not include the total price of the articles eligible for rebate of the current purchase, the total price of the articles eligible for rebate of the current purchase can be added to the amount eligible for rebate. For example, if the amount eligible for rebate as far as the last purchase is ¥ 49,000, and the total price of the articles eligible for rebate of the current purchase is ¥ 1,200, the rebate of the current purchase can be calculated on the basis of the sum of these amount, i.e., 50,200.

(2) Although the remaining rebate is stored as the carry-over o the current purchase in the embodiment, the carry-over can be converted into the amount eligible for rebate, which is stored in the memory.

(3) In the above embodiment, from the view point of service, the articles are categorized into three classes: non-rebate articles, regular rebate articles, and double rebate articles. However these categories are not limited to the three classes. For example, three-times-rebate articles can be included. Incidentally, articles which by law may not be rebated belong to the class of non-rebate articles.

(4) In the above embodiment, non-rebate periods in which the rebate service is not performed are not provided for. However, non-rebate periods or rebate periods can be provided so that the rebate is carried out only during the rebate period.

(5) Although, a customer number is entered by using a bar-code card in the above embodiment, a customer number can be entered by using other means: for example, by using an IC (Integrated Circuit) card, or a magnetic card; or by using a keyboard or voice print.

(6) Although the embodiment above is described in the case where the invention is applied to an electronic scale, the invention can be applied to other apparatuses such as terminals of an ECR (Electronic Cash Register) or a POS (Point Of Sale) system, or an automatic vending system. Moreover, the invention can be applied to such systems which have a master apparatus having data managing and calculating functions, and slave terminals connected to the master apparatus, and in which the master apparatus calculates the data transmitted from the slave terminals.

(7) In the above embodiment, updating of the article data in the PLU file and the customer data in the customer file is executed when a receipt is printed. This makes it possible to avoid the correction of the contents of the PLU file and the customer file even if some articles or portions thereof are refused because the customer decides this has been an over-purchase when the total price is displayed. However, updating of the article data and the customer data can be performed when the receipt data are stored into the receipt buffer.

Accordingly, it is intended that the invention be limited only by the scope of the appended claims.

What is claimed is:

1. A sales-data-processing apparatus comprising:
computing means for computing a potential discount for each customer on the basis of the total price of articles which are purchased by the customer and are eligible for discount;
storing means for storing said potential discount or said total price from which said potential discount is calculated for each customer;
input means including primary input means for entering customer-identification data for identifying each customer, and secondary input means for entering the discount desired by the customer at the time of calculation;
subtraction means for subtracting said desired discount from the total price of the current purchase so as to obtain the final price of the current purchase;
display means including primary display means for displaying said potential customer discount according to said customer-identification data entered from said primary input means, and secondary display means for displaying said final price; and
updating means for updating said storing means on the basis of said desired discount and said total price of the articles eligible for discount of the current purchase, wherein a remaining discount is obtained by subtracting said desired discount from said potential customer discount in order to obtain a new potential customer discount which is stored in said storing means for use by said customer at the time of a next purchase.

2. A sales-data-processing apparatus according to claim 1, wherein said storing means includes a primary location in which a primary discount based on said total price of the articles eligible for discount of the purchases including the current purchase is stored, and a secondary location in which a secondary discount based on the carry-over from the previous purchase is stored.

3. A sales-data-processing apparatus according to claim 1 further comprising price-look-up means in which article data are stored according to price-look-up numbers corresponding to each article, said price-look-up means includes flags each of which corresponds to one of the articles, and indicates the grade of discount of the article.

4. A sales-data-processing apparatus according to claim 3, wherein said flag indicates that the article is a non-discount article, a regular discount article, or a double discount article.

5. A sales-data-processing apparatus according to claim 3 further comprising weighing means for measuring the weight of the article, and means for calculating the price of the article by multiplying the weight of the article by the unit price of the article, said unit price being included in said article data.

6. A sales-data-processing apparatus according to claim 1, wherein said display means is a double screen display having two screens which are provided back to back for displaying in opposite directions, such that said double screen display displays the final price of the current purchase as well as the rebate on both screens.

7. A sales-data-processing apparatus according to claim 1, wherein said customer-identification data is a customer number recorded on a membership card.

8. A sales-data-processing apparatus according to claim 7, wherein said primary input means for entering customer-identification data is a bar-code reader which is detachable from said sales-data-processing apparatus.

9. A sales-data-processing apparatus according to claim 1 further comprising customer-file means including telephone numbers of the customers, wherein said customer-identification data is the telephone number of the customer entered from said input means.

10. A sales-data-processing apparatus according to claim 1 further comprising customer-file means including birth dates of the customers, timer means producing date data, and means for comparing said birth date of the customer with the date data to determine if the day of the purchase is the customer's birthday, and making said display means display a birthday message if the day is the birthday of the customer.

11. A sales-data-processing apparatus according to claim 1 further comprising printing means which prints at least the total price of the current purchase, rebate, and the final price of the current purchase.

* * * * *